(12) United States Patent
Mendoza et al.

(10) Patent No.: US 7,275,247 B2
(45) Date of Patent: Sep. 25, 2007

(54) METHOD AND APPARATUS FOR HANDLING THREADS IN A DATA PROCESSING SYSTEM

(75) Inventors: Alfredo V. Mendoza, Georgetown, TX (US); Joel Howard Schopp, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 736 days.

(21) Appl. No.: 10/246,889

(22) Filed: Sep. 19, 2002

(65) Prior Publication Data

US 2004/0060049 A1    Mar. 25, 2004

(51) Int. Cl.
*G06F 9/46* (2006.01)

(52) U.S. Cl. ............... 718/100; 718/102; 718/104

(58) Field of Classification Search ............ 718/1, 718/100–106; 711/100; 717/149
See application file for complete search history.

(56) References Cited

U.S. PATENT DOCUMENTS

| | | | | |
|---|---|---|---|---|
| 5,515,538 A | * | 5/1996 | Kleiman | 710/260 |
| 5,692,193 A | * | 11/1997 | Jagannathan et al. | 718/106 |
| 5,812,852 A | * | 9/1998 | Poulsen et al. | 717/149 |
| 5,872,963 A | * | 2/1999 | Bitar et al. | 712/233 |
| 5,950,221 A | * | 9/1999 | Draves et al. | 711/100 |
| 6,542,920 B1 | * | 4/2003 | Belkin et al. | 718/104 |
| 6,654,781 B1 | * | 11/2003 | Browning | 718/104 |
| 6,728,722 B1 | * | 4/2004 | Shaylor | 707/101 |
| 6,732,138 B1 | * | 5/2004 | Browning et al. | 718/102 |
| 6,832,266 B1 | * | 12/2004 | Shaylor | 719/328 |

OTHER PUBLICATIONS

Koppe, "Sleeping Threads: A Kernel Mechanism for Support of Efficient User Level Threads", Proceedings of the ISMM International Conference on Parallel and Distributed Computing and Systems, Oct. 19, 1995, pp. 11-15.

Cantrill et al., "ThreadMon: a tool for monitoring multithreaded program performance", System Sciences, 1997, Proceedings of the Thirtieth Hawaii International Conference on Wailea, HI, Jan. 1997, Los Alamitos CA, IEEE, vol. 1, Jan. 7, 1997, pp. 253-265.

* cited by examiner

*Primary Examiner*—Van Nguyen
(74) *Attorney, Agent, or Firm*—Duke W. Yee; Diana R. Gerhardt; Peter B. Manzo

(57) ABSTRACT

A system for managing threads. A kernel tread associated with a user thread is detected as being unneeded by the user tread. The kernel thread is semi-detached in which data for the thread does not change stacks in response to the kernel thread being unneeded.

14 Claims, 6 Drawing Sheets

METHOD AND APPARATUS FOR HANDLING THREADS IN A DATA PROCESSING SYSTEM

BACKGROUND OF THE INVENTION

1. Technical Field

The present invention relates generally to an improved data processing system, and in particular, to a method and apparatus for managing threads in a data processing system. Still more particularly, the present invention provides a method and apparatus for increasing performance in the handling of sleeping and waking threads.

2. Description of Related Art

A thread is a basic unit of central processing unit (CPU) utilization. A thread usually has a program counter, a register set, and a stack space. A thread shares with other threads its code section, data section, and operating system resources, such as open files and signals. These components are also known as a "task". Some systems implement user threads in user level libraries, rather than via system calls, such that thread switching does not need to call the operating system and cause an interrupt to the kernel.

Threads operate, in many respects, in the same manner as processes. A thread may be in one of several states: ready, blocked, sleeping, running, or terminated. User threads in a user space are run by kernel threads in a kernel. A kernel thread is also referred to as a "virtual processor". In some cases, a one-to-one model is used in which each user thread has a corresponding kernel thread. In other cases, an M:N model is used in which many user threads are run on a few kernel threads for increased performance. With this model, situations occur, such as blocking on a mutex, in which a kernel thread is no longer needed to run a particular user thread. A mutex is a locking mechanism involving the use of a programming flag used to grab and release an object. When data is acquired that cannot be shared or processing is started that cannot be performed simultaneously elsewhere in the system, the mutex is set to "lock," which blocks other attempts to use it. The mutex is set to "unlock" when the data is no longer needed or the routine is finished. If no other user threads are currently runnable, this kernel thread will detach itself from that particular user thread and enter a sleeping state.

Detachment of a kernel thread to enter a sleep state results in a number of actions occurring. One action taken is that the kernel thread switches from a user stack to its own smaller stack. Additionally, the kernel thread sets up signal masking to block most signals. When the kernel thread is needed again, this thread will switch to the stack of the user thread and set up several thread specific attributes, such as signal masks.

The present invention recognizes that this currently used detachment and subsequent reattachment mechanism involves a large performance overhead. Each detachment or reattachment requires a system call to copy data from user space to kernel space or to kernel space from user space. Additionally, several locks are used in both the kernel library and in the kernel, resulting in possibly increasing lock contention. This type of detachment also involves potential signal handling problems. Specifically, a small window is present before the kernel thread blocks signals where the kernel thread might receive a signal while executing on its small kernel stack. The present invention also recognizes that a signal handler, which runs fine on a larger user thread stack, may overflow the smaller kernel thread stack corrupting the memory and/or causing the application to core dump.

These two problems of performance overhead and stack overflow are separate problems, but have a similar root cause. This cause is the detaching of "idle" kernel threads. Therefore, it would be advantageous to have an improved method, apparatus, and computer instructions for handling idle kernel threads in a manner that reduces performance overhead and avoids stack overflows.

SUMMARY OF THE INVENTION

The present invention provides a method, apparatus, and computer instructions for managing threads. A kernel thread associated with a user thread is detected as being unneeded by the user thread. The kernel thread is semi-detached in which data for the thread does not change stacks in response to the kernel thread being unneeded.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
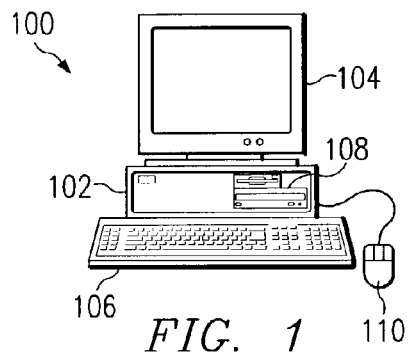
FIG. 1 is a pictorial representation of a data processing system in which the present invention may be implemented in accordance with a preferred embodiment of the present invention.

With reference now to the figures and in particular with reference to FIG. 1, a pictorial representation of a data processing system in which the present invention may be implemented is depicted in accordance with a preferred embodiment of the present invention. A computer 100 is depicted which includes system unit 102, video display terminal 104, keyboard 106, storage devices 108, which may include floppy drives and other types of permanent and removable storage media, and mouse 110. Additional input devices may be included with personal computer 100, such as, for example, a joystick, touchpad, touch screen, trackball, microphone, and the like. Computer 100 can be implemented using any suitable computer, such as an IBM eServer computer or IntelliStation computer, which are products of International Business Machines Corporation, located in Armonk, N.Y. Although the depicted representation shows a computer, other embodiments of the present invention may be implemented in other types of data processing systems, such as a network computer. Computer 100 also preferably includes a graphical user interface (GUI) that may be implemented by means of systems software residing in computer readable media in operation within computer 100.

Figure 2:
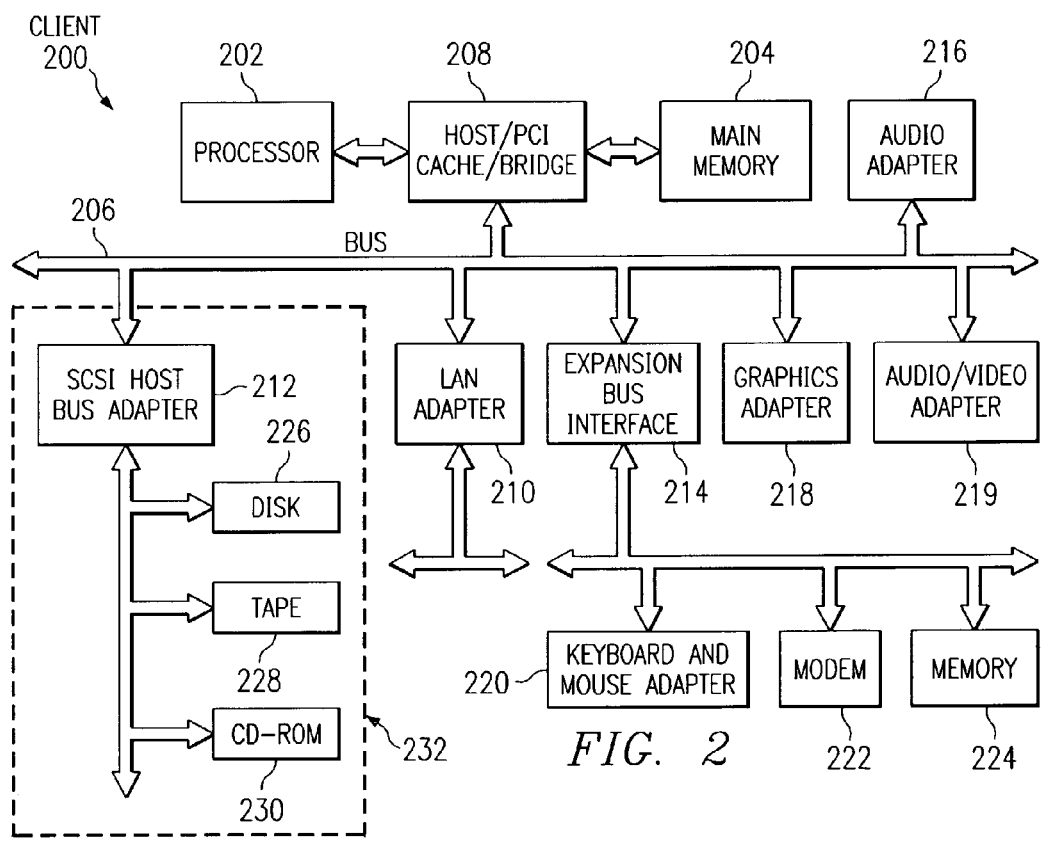
FIG. 2 is a block diagram of a data processing system in which the present invention may be implemented.

With reference now to FIG. 2, a block diagram of a data processing system is shown in which the present invention may be implemented. Data processing system 200 is an example of a computer, such as computer 100 in FIG. 1, in which code or instructions implementing the processes of the present invention may be located. Data processing system 200 employs a peripheral component interconnect (PCI) local bus architecture. Although the depicted example employs a PCI bus, other bus architectures such as Accelerated Graphics Port (AGP) and Industry Standard Architecture (ISA) may be used. Processor 202 and main memory 204 are connected to PCI local bus 206 through PCI bridge 208. PCI bridge 208 also may include an integrated memory controller and cache memory for processor 202. In the depicted example, local area network (LAN) adapter 210, small computer system interface SCSI host bus adapter 212, and expansion bus interface 214 are connected to PCI local bus 206 by direct component connection. In contrast, audio adapter 216, graphics adapter 218, and audio/video adapter 219 are connected to PCI local bus 206 by add-in boards inserted into expansion slots. Expansion bus interface 214 provides a connection for a keyboard and mouse adapter 220, modem 222, and additional memory 224. SCSI host bus adapter 212 provides a connection for hard disk drive 226, tape drive 228, and CD-ROM drive 230. Typical PCI local bus implementations will support three or four PCI expansion slots or add-in connectors.

An operating system runs on processor 202 and is used to coordinate and provide control of various components within data processing system 200 in FIG. 2. The operating system may be a commercially available operating system such as Advanced Interactive executive (AIX) or Windows XP. AIX is a version of UNIX and is available from International Business Machines Corporation. Windows XP is available from Microsoft Corporation. Instructions for the operating system and applications or programs are located on storage devices, such as hard disk drive 226, and may be loaded into main memory 204 for execution by processor 202.

Those of ordinary skill in the art will appreciate that the hardware in FIG. 2 may vary depending on the implementation. Other internal hardware or peripheral devices, such as flash read-only memory (ROM), equivalent nonvolatile memory, or optical disk drives and the like, may be used in addition to or in place of the hardware depicted in FIG. 2. Also, the processes of the present invention may be applied to a multiprocessor data processing system.

For example, data processing system 200, if optionally configured as a network computer, may not include SCSI host bus adapter 212, hard disk drive 226, tape drive 228, and CD-ROM drive 230. In that case, the computer, to be properly called a client computer, includes some type of network communication interface, such as LAN adapter 210, modem 222, or the like. As another example, data processing system 200 may be a stand-alone system configured to be bootable without relying on some type of network communication interface, whether or not data processing system 200 comprises some type of network communication interface. As a further example, data processing system 200 may be a personal digital assistant (PDA), which is configured with ROM and/or flash ROM to provide non-volatile memory for storing operating system files and/or user-generated data. The depicted example in FIG. 2 and above-described examples are not meant to imply architectural limitations. For example, data processing system 200 also may be a notebook computer or hand held computer in addition to taking the form of a PDA. Data processing system 200 also may be a kiosk or a Web appliance.

The processes of the present invention are performed by processor 202 using computer implemented instructions, which may be located in a memory such as, for example, main memory 204, memory 224, or in one or more peripheral devices 226-230.

Figure 3:
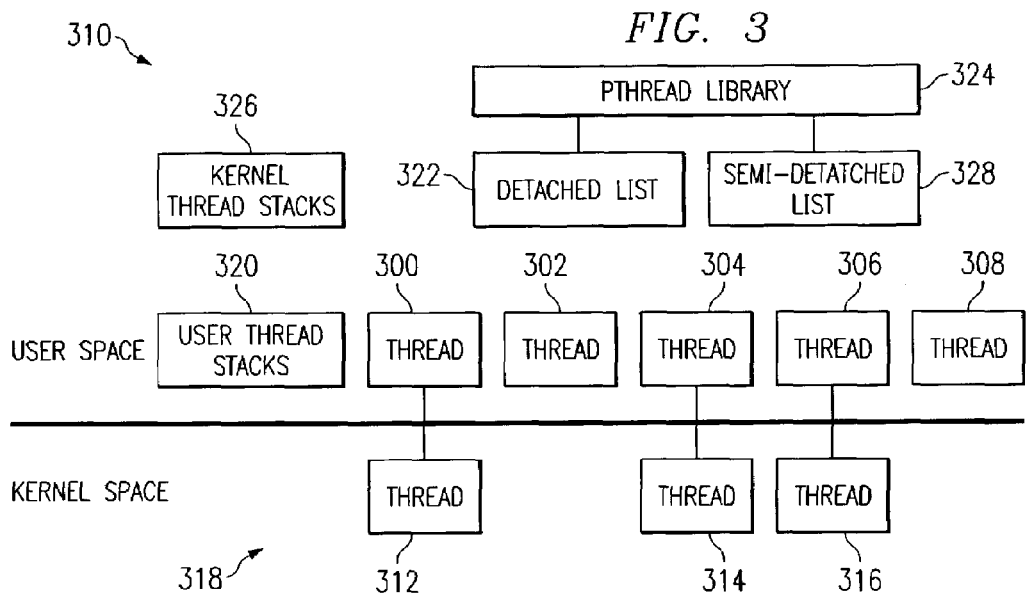
FIG. 3 is a diagram illustrating components used in handling kernel threads in accordance with a preferred embodiment of the present invention.

Turning now to FIG. 3, a diagram illustrating components used in handling kernel threads is depicted in accordance with a preferred embodiment of the present invention. In this example, user threads 300, 302, 304, 306, and 308 are located in user space 310, while kernel threads 312, 314, and 316 are located in kernel space 318. These threads in this example follow the M:N model in which many user threads are run on a few kernel threads to increase performance.

Currently, user thread 300 is being run by kernel thread 312, user thread 304 is being run by kernel thread 314, and user thread 306 is being run by kernel thread 316. Operations performed for these user threads are located in user thread stacks 320. Each user thread is associated with one user thread stack. Kernel threads 312, 314, and 316 have data located in user thread stacks 320. The particular stack in user thread stacks 320 is a stack associated with the user thread being run by the kernel thread.

Normally, if a kernel thread, such as kernel thread 312, is no longer needed to run a user thread, such as user thread 300, kernel thread 312 will detach itself and enter a sleep state along with user thread 300. Kernel threads in a sleep state are normally placed in detached list 322, which is managed by Pthread library 324. Pthread library 324 is a dynamically loadable library, which is used in AIX. With a detachment from user thread 300, the information for kernel thread 312, which represents the current stack pointer that points to the user thread stack in user thread stacks 320 is modified to point to the area reserved for its kernel thread stack in kernel thread stacks 326. When user thread 300 wakes from a sleep state, kernel thread 312 may be removed from detached list 322 and reattached to user thread 300. Alternatively, if kernel thread 312 is unavailable, another available kernel thread in detached list 322 may be attached to user thread 300.

In accordance with a preferred embodiment of the present invention, when user thread 300 enters a state in which kernel thread 312 is unneeded, such as a sleep state, kernel thread 312 is placed on semi-detached list 328, rather than detached list 322, by Pthread library 324. With semi-detachment, kernel thread 312 does not change its stack or signal mask. Instead, kernel thread 312 is placed on semi-detached list 328 and sleeps concurrently with user thread 300. In this concurrent sleep state, kernel thread 312 maintains information, such as the stack and signal mask of the user thread for which it is concurrently sleeping. This information is also referred to as "user thread specific attributes". With this concurrent sleep, kernel thread 312 identifies itself as being available to run other user threads, but would prefer a thread on detached list 322 to be used first. Preference is given to running the user thread with which kernel thread 312 is associated, user thread 300. Semi-detached list 328 may be implemented in different manners depending on the particular implementation. In this example, this list is implemented as a linked kernel of thread structures.

If user thread 300 wakes from a sleep state, kernel thread 312 will remove itself from semi-detached list 328 and continue running user thread 300. This mechanism provides a path in which lower latency is involved in waking up a thread in Pthread library 324. Such a mechanism is useful when waking up from a contested mutex, a condition variable, or a signal because actions performed following these events often need to be completed before the rest of the program may progress.

If a kernel thread in semi-detached list 328 is needed to run another user thread at a later time, a performance penalty for the remaining detachment may be avoided by detaching from the state of the current user thread to the state of the new user thread without detaching the kernel thread. For example, if kernel thread 312 is on semi-detached list 328 and another user thread, such as user thread 302, requires kernel thread 312 to run that thread, the stack associated with user thread 300 may be attached to user thread 302 by changing properties within the stack for user thread 300 to match those of user thread 302. For example, the stack pointer and the signal mask may be changed from the ones for user thread 300 to user thread 302.

As a result, a kernel thread only fully detaches when a user thread associated with the kernel thread exits or ends. Consequently, the performance overhead associated with normal detachments is avoided for most cases.

Figure 4A:
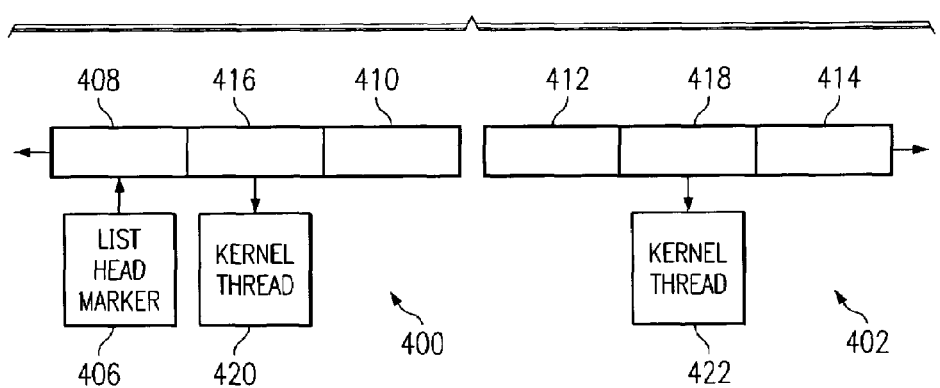
FIGS. 4A-4C are illustrations of data structures used in a semi-detached list in accordance with a preferred embodiment of the present invention.
Figure 4B:
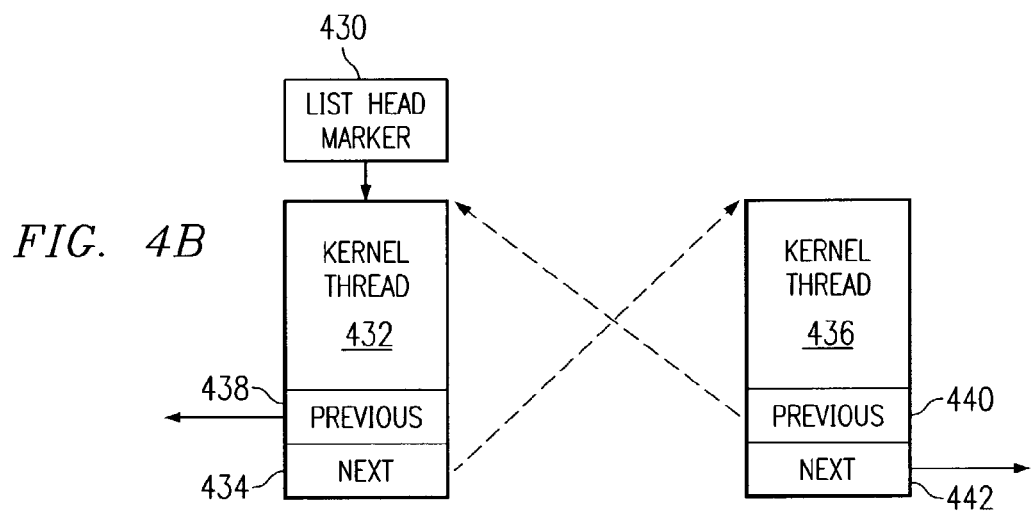
Figure 4C:
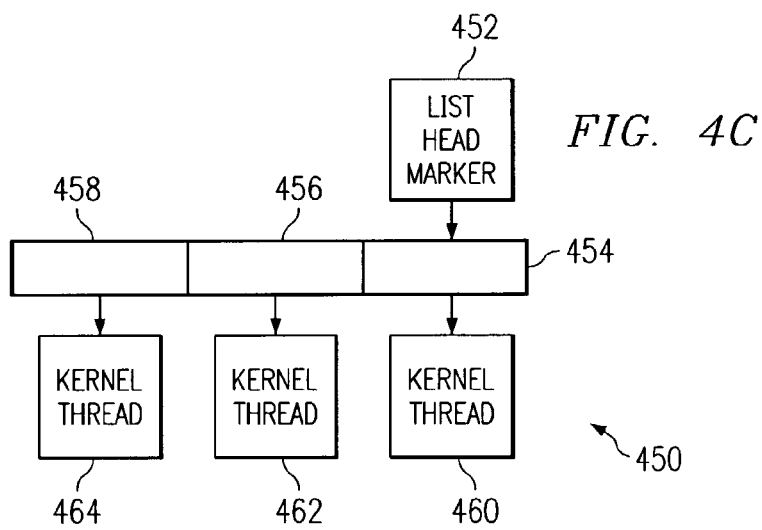

Turning next to FIGS. 4A-4C, illustrations of data structures used in a semi-detached list are depicted in accordance with a preferred embodiment of the present invention. These data structures may be used to implement a semi-detached list, such as semi-detached list 328 in FIG. 3.

In FIG. 4A, a linked list is used to point to the different kernel threads. For example, entries 400 and 402 are used to point to the different kernel threads. List head marker 406 identifies the beginning of the linked list. Entry 400 contains previous pointer 408 and next pointer 410. Entry 402 contains previous pointer 412 and next pointer 414. These pointers are used to point to a previous and next entry within the linked list. Further, entry 400 includes pointer 416 and entry 402 includes pointer 418 with these pointers pointing to kernel threads, such as kernel threads 420 and 422.

Next, in FIG. 4B, the information used in the list structure is incorporated into the thread structures. In this example, list head marker 430 points to the beginning or first thread, kernel thread 432. Kernel thread 432 contains next pointer 434, which points to kernel thread 436. Kernel thread 432 also includes previous pointer 438, which points to some previous kernel in the list. Kernel thread 436 contains previous pointer 440, which points back to kernel thread 432. Next pointer 442 in kernel thread 436 points to the next kernel thread in the list. This example is the preferred list structure in the illustrated examples.

In FIG. 4C, array 450 is used to point to the different kernel threads. List head marker 452 points to the beginning of array 450, which contains pointers 454, 456, and 458. These pointers point to kernel threads 460, 462, and 464, respectively. These examples are only provided as illustrations as to how a semi-detached list may be implemented. Other types of structures, such as a tree, may be used depending on the particular implementation.

Figure 5:
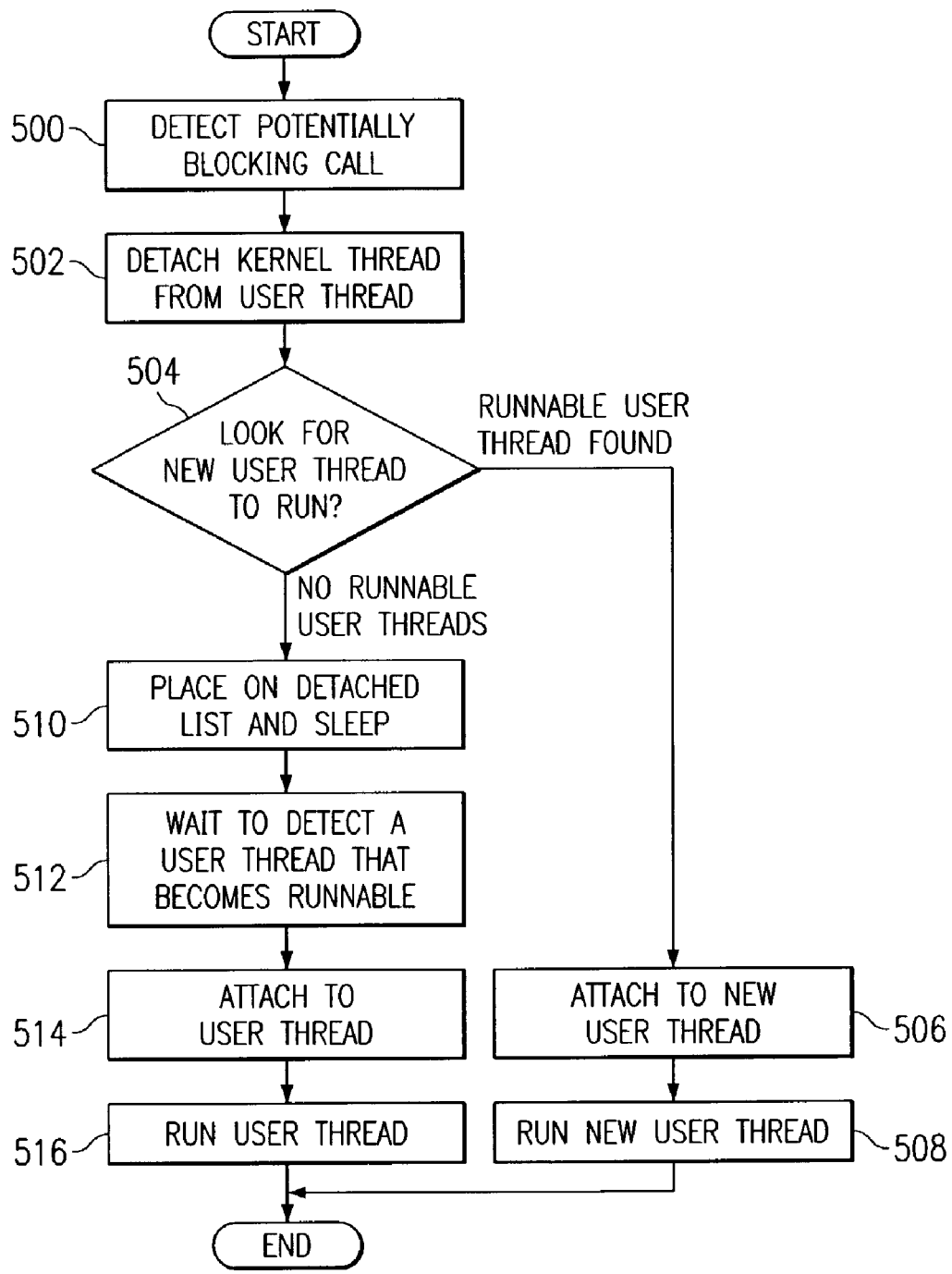
FIG. 5 is a flowchart of a known method used for handling blocking calls.

With reference now to FIG. 5, a flowchart of a known method used for handling blocking calls is depicted. The method illustrated in FIG. 5 may be implemented in a library, such as Pthread library 324 in FIG. 3. A blocking call is any call, which may cause a user level thread to change from a running or runnable state to another state that is a waiting or sleeping state.

The method begins by detecting a potentially blocking call (step 500). The method detaches the kernel thread from the user thread (step 502). Step 502 requires the overhead of copying information from the user thread stack to a kernel thread stack as well as other operations, such as changing signal masking to block signals. Next, the method looks for a new user thread to run (step 504). If a runnable thread is found, the kernel thread attaches to the new user thread (step 506). Step 506 involves overhead, such as copying data from a kernel thread stack to the user thread stack as well as setting up a signal mask. The new user thread is run (step 508) and the method ends thereafter.

With reference again to step 504, if there are no runnable threads, the kernel thread is placed on a detached list and goes into a sleep state (step 510). Thereafter, the method waits to detect a user thread that becomes runnable (step 512). Afterwards, the kernel thread is attached to the user thread that is detected as being runnable (step 514). The user thread is then run by the kernel thread (step 516) and the method ends thereafter.

Figure 6:
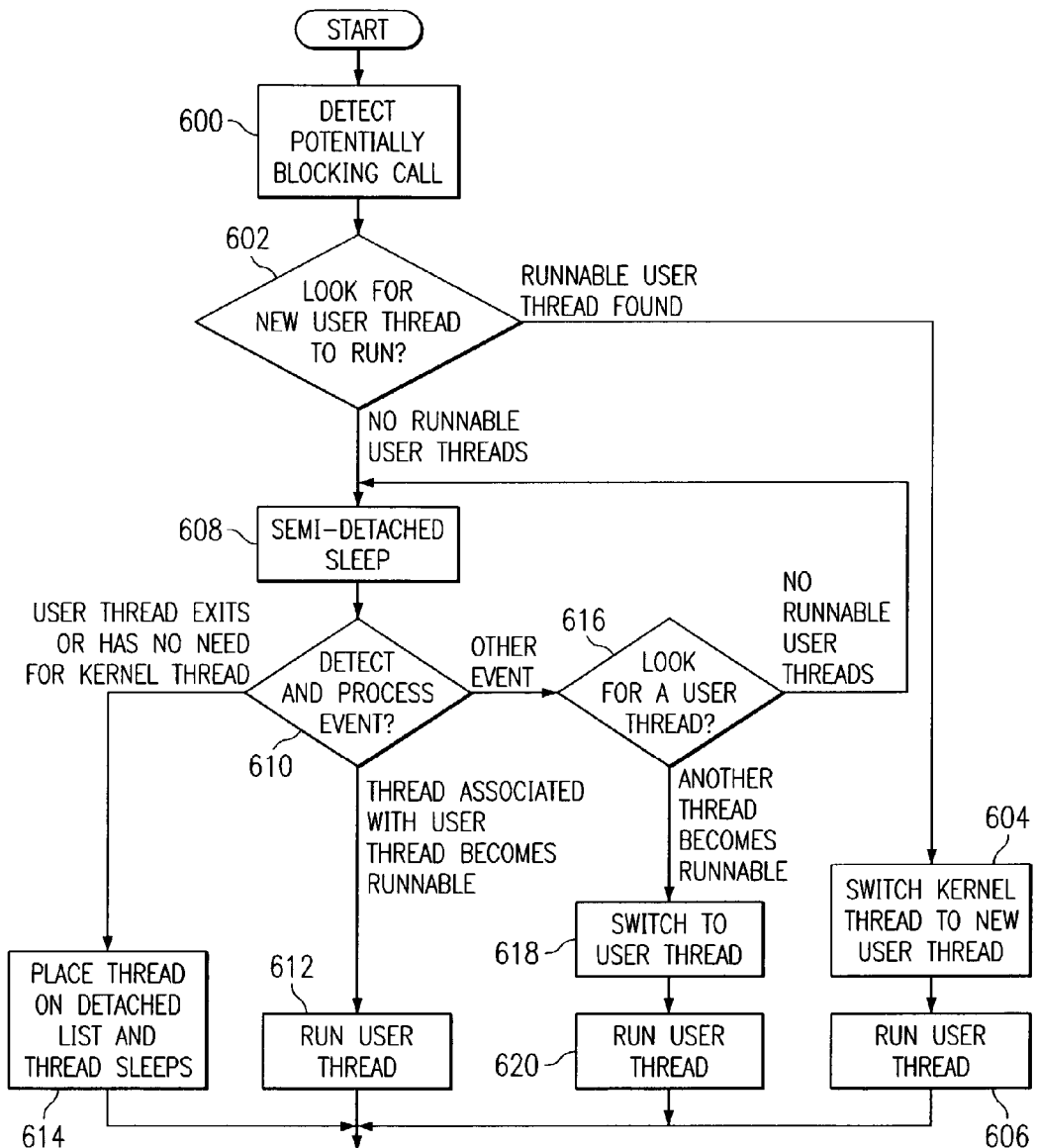
FIG. 6 is a flowchart of a method used for managing idle threads in accordance with a preferred embodiment of the present invention.

Turning now to FIG. 6, a flowchart of a method used for managing idle threads is depicted in accordance with a preferred embodiment of the present invention. The method illustrated in FIG. 6 may be implemented in a library, such as Pthread library 324 in FIG. 3.

The method begins by detecting a potentially blocking call (step 600). This potentially blocking call is one that places the user level thread into a waiting or sleeping state. A thread that is sleeping or waiting is referred to as a "non-runnable" thread. The method then looks for a new user thread to run (step 602). If a runnable user thread is found, the method switches the kernel thread to the new user thread (step 604). The switching in step 604 may be accomplished through the use of a user level dispatcher. Depending on the particular implementation, this switching may or may not require detachment and reattachment of the kernel thread. The user thread is run by the kernel thread (step 606) with the method ending thereafter.

Turning again to step 602, if no runnable user threads are found, the kernel thread is placed into a semi-detached sleep (step 608). In this type of sleep, the kernel thread is placed on a semi-detached list and then goes into a sleep state. The user thread associated with the kernel thread is maintained or listed in the semi-detached list with the kernel thread. This association is made to indicate a preference to use that particular kernel thread to run the user thread, rather than running another user thread unless necessary.

Thereafter, an event is detected and processed (step 610). If the event is a user thread associated with the kernel thread becoming runnable, that user thread is run by the kernel thread (step 612) and the method ends thereafter. With reference again to step 610, if the user thread associated with the kernel thread exits or otherwise has no need for the kernel thread, the kernel thread is placed on a detached list and sleeps (step 614) with the method ending thereafter. More specifically, step 614 enters a series of steps illustrated in FIG. 5, beginning at step 510.

Turning back to step 610, if the event is any other event, the method looks for a user thread to run (step 616). If no runnable threads are found, the method returns to step 608. Otherwise, if another user thread becomes runnable, the method switches the kernel thread to the user thread that became runnable (step 618). This step may include two operations, a detach and an attach. Alternatively, a single operation in which the kernel thread is switched from the current user thread to the new user thread may be employed.

The user thread is then run by the kernel thread (step 620) with the method ending thereafter.

Figure 7:
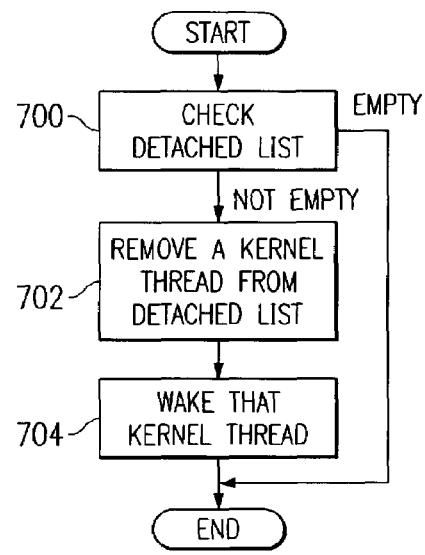
FIG. 7 is a flowchart of a known method used for waking a kernel thread.

With reference now to FIG. 7, a flowchart of a known method used for waking a kernel thread is depicted. The method illustrated in FIG. 7 may be implemented in a library, such as Pthread library 324 in FIG. 3. The method illustrated in this figure allows a thread to wait or sleep until a user thread is detected as becoming runnable.

The method begins by checking a detached list for kernel threads (step 700). If the detached list is not empty, a kernel thread is removed from the detached list (step 702). The kernel thread is awakened (step 704) with the method ending thereafter. With reference again to step 700, if the detached list is empty, the method ends.

Figure 8:
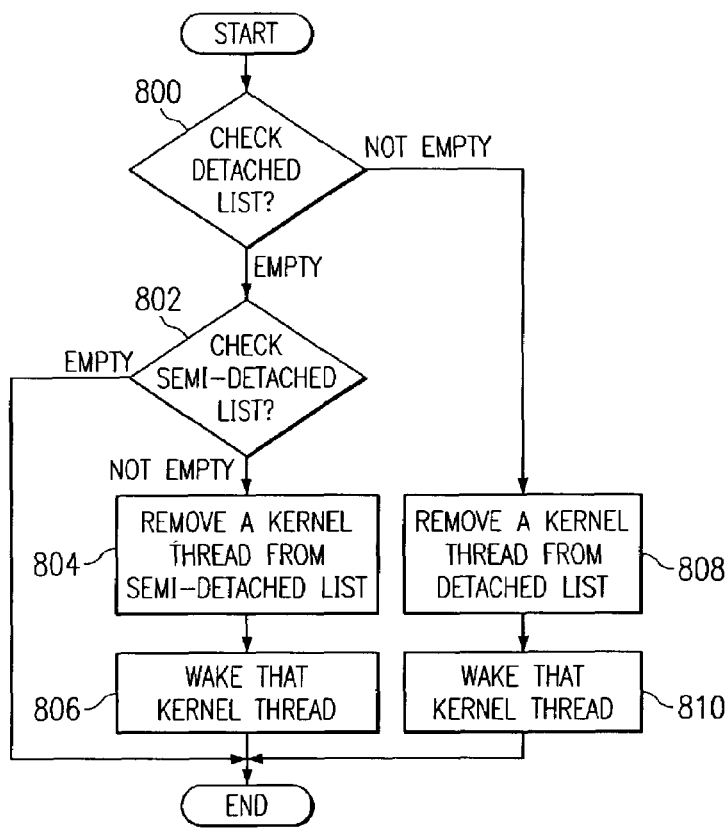
FIG. 8 is a flowchart of a method used for handling a kernel thread in accordance with a preferred embodiment of the present invention.

Turning now to FIG. 8, a flowchart of a method used for handling a kernel thread is depicted in accordance with a preferred embodiment of the present invention. The method illustrated in FIG. 8 may be implemented in a library, such as Pthread library 324 in FIG. 3. This method is initiated in a kernel thread that makes another kernel thread runnable.

The method begins by checking a detached list for a kernel thread (step 800). If the detached list is empty, the method checks a semi-detached list for a kernel thread (step 802). If the semi-detached list is empty, the method ends. Otherwise, if the semi-detached list is not empty, a kernel thread is removed from the semi-detached list (step 804). This kernel thread, removed from the semi-detached list, is awakened (step 806) with the method ending thereafter. At that point, the kernel thread runs.

With reference again to step 800, if the detached list is not empty, a kernel thread is removed from the detached list (step 808). The kernel thread is awakened (step 810) with the method ending thereafter. The mechanism of the present invention still employs a detached list because detachment, rather than semi-detachment, may be necessary in some situations. This list may be needed for existing user threads. In this case, selection of a kernel thread from the detached list is preferred over selection of a kernel thread from a semi-detached list when waking user threads.

Thus, the present invention provides an improved method, apparatus, and computer instructions for handling idle kernel threads. The mechanism of the present invention avoids the overhead currently involved with detaching and subsequent reattaching of kernel threads. Further, the mechanism of the present invention also avoids stack overflows that may occur. These advantages are provided through the use of a semi-detachment method. This method involves placing the kernel thread in a semi-detached list and then putting the kernel thread into a sleep state. These steps occur without requiring the steps that are normally required in detaching a kernel thread from a user thread.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for managing threads, the method comprising:

detecting by a processing unit in the data processing system a kernel thread associated with a user thread;

determining by the processing unit that the kernel thread is unneeded by the user thread;

responsive to the kernel thread being unneeded, semi-detaching, by the processing unit, the kernel thread by placing the kernel thread on a semi-detached list and in an unrunnable state concurrent with the user thread, wherein the kernel thread maintains information regarding a same user stack and signal mask of the user thread, and wherein data for the kernel thread remains on the same user stack as data for the user thread in case the user thread later needs the kernel thread, and wherein the threads execute in an operating system of the data processing system; and responsive to the user thread waking from sleep, removing by the processing unit the kernel thread from the semi-detached list, wherein reattachment to the user thread is unnecessary.

2. The method of claim 1, wherein the threads execute in an advanced interactive executive operating system.

3. The method of claim 1, wherein data for the kernel thread remains on the same user stack without requiring copying of the data to a kernel stack to semi-detach the kernel thread.

4. The method of claim 1, wherein the detecting and semi-detaching steps are performed using a library.

5. The method of claim 1 further comprising:

responsive to the user thread waking from sleep, determining by the processing unit whether a second kernel tread is detached rather than semi-detached; and responsive to the second kernel thread being detached, attaching by the processing unit the second kernel thread to the user thread.

6. The method of claim 1, wherein the unrunnable state is one of a waiting state or a sleeping state.

7. A data processing system for managing threads, the data processing system comprising:

a bus system;

a communications unit connected to the bus system;

a memory connected to the bus system, wherein the memory includes a set of instructions; and a processing unit connected to the bus system, wherein the processing unit executes the set of instructions to perform the following steps:

detecting a kernel thread associated with a user thread;

determining that the kernel thread is unneeded by the user thread;

in response to the kernel thread being unneeded, semi-detaching the kernel thread by placing the kernel thread on a semi-detached list and in an unrunnable state concurrent with the user thread, wherein the kernel thread maintains information regarding a same user stack and signal mask of the user thread, and wherein data for the kernel thread remains on the same user stack as data for the user thread in case the user thread later needs the kernel thread, and wherein the threads execute in an operating system of the data processing system; and in response to the user thread waking from sleep, removing by the processing unit the kernel thread from the semi-detached list, wherein reattachment to the user thread is unnecessary.

8. A data processing system for managing threads, the data processing system comprising:

a bus system;

a memory connected to the bus system;

detecting means for detecting a kernel thread associated with a user thread;

determining means for determining that the kernel thread is unneeded by the user thread;

semi-detaching means, responsive to the kernel thread being unneeded, for semi-detaching the kernel thread by placing the kernel thread on a semi-detached list and in an unrunnable state concurrent with the user thread, wherein the kernel thread maintains information regarding a same user stack and signal mask of the user thread, and wherein data for the kernel thread remains on the same user stack as data for the user thread in case the user thread later needs the kernel thread, and wherein the threads execute in an operating system of the data processing system; and removing means, responsive to the user thread waking from sleep, for removing the kernel thread from the semi-detached list, wherein reattachment to the user thread is unnecessary.

9. The data processing system of claim 8, wherein the threads execute in an advanced interactive executive operating system.

10. The data processing system of claim 8, wherein data for the kernel thread remains on the same user stack without requiring copying of the data to a kernel stack to semi-detach the kernel thread.

11. The data processing system of claim 8, wherein the detecting and semi-detaching steps are performed using a library.

12. The data processing system of claim 8 further comprising:

determining means, responsive to the user thread waking from sleep, for determining whether a second kernel thread is detached rather than semi-detached; and attaching means, responsive to the second kernel thread being detached, for attaching the second kernel thread to the user thread.

13. The data processing system of claim 8 wherein the unrunnable state is one of a waiting state or a sleeping state.

14. A computer program product in a computer readable storage medium for managing threads, the computer program product comprising:

first instructions for detecting a kernel thread associated with a user thread;

second instructions for determining that the kernel thread is unneeded by the user thread;

third instructions, responsive to the kernel thread being unneeded, for semi-detaching the kernel thread by placing the kernel thread on a semi-detached list and in an unrunnable state concurrent with the user thread, wherein the kernel thread maintains information regarding a same user stack and signal mask of the user thread, and wherein data for the kernel thread remains on the same user stack as data for the user thread in case the user thread later needs the kernel thread, and wherein the threads execute in an operating system of a data processing system; and fourth instructions, responsive to the user thread waking from sleep, removing by a processing unit the kernel thread from the semi-detached list, wherein reattachment to the user thread is unnecessary.

* * * * *